United States Patent [19]

Andert et al.

[11] Patent Number: 4,688,973
[45] Date of Patent: Aug. 25, 1987

[54] AUTOMATED MACHINE TOOL

[75] Inventors: Charles M. Andert, Florissant; John E. Corley, St. Charles, both of Mo.

[73] Assignee: McDonnell Douglas Corporation, Long Beach, Calif.

[21] Appl. No.: 696,655

[22] Filed: Jan. 31, 1985

[51] Int. Cl.[4] ............................ B23C 9/00; B23B 3/00
[52] U.S. Cl. ...................................... 409/80; 82/2 E; 408/157; 408/158; 409/183
[58] Field of Search ................ 409/80, 183, 204, 215, 409/191, 206, 207; 318/571; 29/568; 82/2 E, 1.2; 408/159, 157, 158, 180

[56] References Cited

U.S. PATENT DOCUMENTS

| | | | |
|---|---|---|---|
| 279,495 | 6/1883 | Nacke | 408/159 X |
| 2,273,228 | 2/1942 | Smith | 408/159 X |
| 3,237,486 | 3/1966 | Gilbert et al. | 409/80 X |
| 3,592,553 | 7/1971 | Heizer | 82/1.2 |
| 3,612,841 | 10/1971 | Kosem et al. | 318/571 |
| 3,656,377 | 4/1972 | Kosem | 318/571 |
| 3,840,791 | 10/1974 | Mack | 318/571 |
| 4,250,775 | 2/1981 | Jerue | 82/1.2 |
| 4,354,305 | 10/1982 | Plummer et al. | 29/568 |
| 4,432,259 | 2/1984 | Werth, Jr. | 408/158 |

FOREIGN PATENT DOCUMENTS

| | | | |
|---|---|---|---|
| 2224918 | 12/1972 | Fed. Rep. of Germany | 318/571 |
| 1204440 | 1/1960 | France | 408/159 |

*Primary Examiner*—William R. Briggs
*Attorney, Agent, or Firm*—Benjamin Hudson, Jr.; George W. Finch; John P. Scholl

[57] ABSTRACT

An automated machine tool is provided having an adjusting apparatus for changing the cutting radius of a cutting tool by changing the tool's position on a horizontal axis perpendicular to the axis of rotation of the cutting tool. A constant cutter feed rate is maintained by adjusting the rotation rate of the cutting tool in proportion to the distance of the cutting tool from the centerline of rotation.

8 Claims, 4 Drawing Figures

AUTOMATED MACHINE TOOL

BACKGROUND OF THE INVENTION

1. Field of the Invention

This invention relates generally to an automated machine tool and more particularly to an automated machine tool having a special machine head capable of adjusting the cutting radius of the cutting tool. Another object of this invention provides a machine head that maintains a constant cutter feed rate in surface feet per minute regardless of the distance of the cutting tool from the centerline of rotation.

2. Description of the Prior Art

Traditionally, numerically controlled machine tools have been generally comprised of a support frame having a moveable worktable, moveable in two perpendicular axes, latitudinally and longitudinally in a horizontal plane. A drive head mounted on the support frame above the horizontal worktable, moves on a vertical axis perpendicular to the horizontal worktable, and supports a rotating spindle with a cutting tool attached thereto. The cutting tool is rotated at a fixed speed rate by the spindle and is lowered by the drive head to machine a workpiece supported on the worktable. Precision cutting is performed, such that the center of a hole is precisely located with respect to the vertical axis of the rotating cutting tool and the combined movement of the worktable in its horizontal plane of movement. During the machining operation, the spindle is rotated at a pre-selected cutting speed and is fed downwardly by the drill head on the quill at a predetermined feed rate.

It is desirable for special machining operations to vary the cutting radius of the cutting tool to machine conical or spherical cavities. A cutting tool with such capability has been attempted with a limited amount of success. See U.S. Pat. No. 3,592,553, issued to Charles K. Heizer, on July 13, 1971 in which a boring tool assembly is disclosed having a means to adjust the rotational radius of the cutting tool. A moveable vertical shaft member is designed to create movement of a horizontal shaft member along a guide track to move the cutting tool inwardly or outwardly with respect to the rotational axis of the spindle.

It would be desirable if there were provided an automatic machine tool that varied the cutting rate of the machine tool and provided a means for maintaining a constant cutter feed rate in surface feet per minute, regardless of the distance of the cutting tool from the centerline of rotation.

SUMMARY OF THE INVENTION

There is provided by this invention a numerically controlled machine tool capable of machining irregular cavities such as conical, spherical, etc. The spindle speed rate is controlled as a function of the position of the boring bar from the centerline of rotation maintaining a constant cutter feed rate in surface feet per minute, regardless of the distance of the cutting tool from the centerline of rotation. A movable isosceles linkage mechanism positions the boring bars along a horizontal axis perpendicular to the axis of the centerline of rotation.

BRIEF DESCRIPTION OF THE PREFERRED EMBODIMENT

Figure 1:
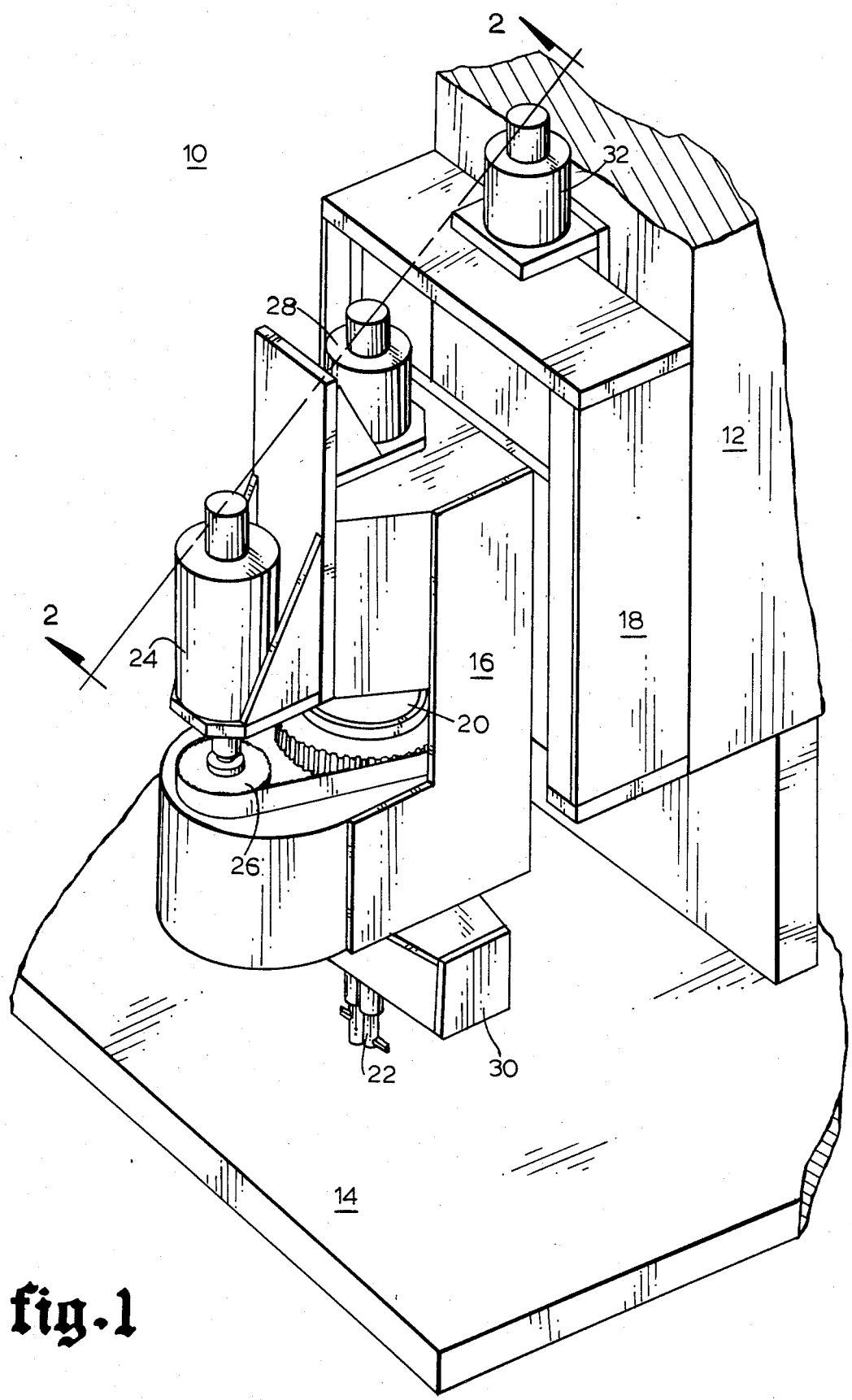
FIG. 1 is a perspective view of a numerically controlled machine tool incorporating the principles of this invention.

Referring to FIG. 1, there is shown a numerically controlled machine tool indicated generally at 10. The machine tool 10 is comprised of a frame 12 having mounted thereon a movable worktable 14 movable longitudinally and latitudinally in a horizontal plane. The movable worktable supports a workpiece and positions the workpiece during machining in a manner well known in the art. Also, mounted on the frame 12 generally above the horizontal worktable is a drive head 16 that is supported on a vertical column 18 for vertical movement thereon. A spindle mechanism 20, to be hereinafter described, is mounted within the drive head 16. The spindle supports a cutting tool such as 22. The drive head 16 positions the spindle mechanism 20 and the cutting tool 22 vertically during a machining operation. Rotation of the spindle mechanism 20 controls the cutting speed rate of the cutting tools 22. A drive motor 24 in response to a programmable control unit, drives the spindle mechanism 20 by means of a drive belt and gear assembly 26. The drive motor 28 increases the cutting radius of the machine tool 10 in response to a programmable control unit by controlling the distance of the cutting tool 22 from the centerline of rotation by moving the cutting tool 22 along a horizontal axis on a track 30 in a manner hereinafter described. Additionally, drive motor 32 in response to a programmable control unit controls the vertical position of the drive head 16 on the column 18.

Figure 2:
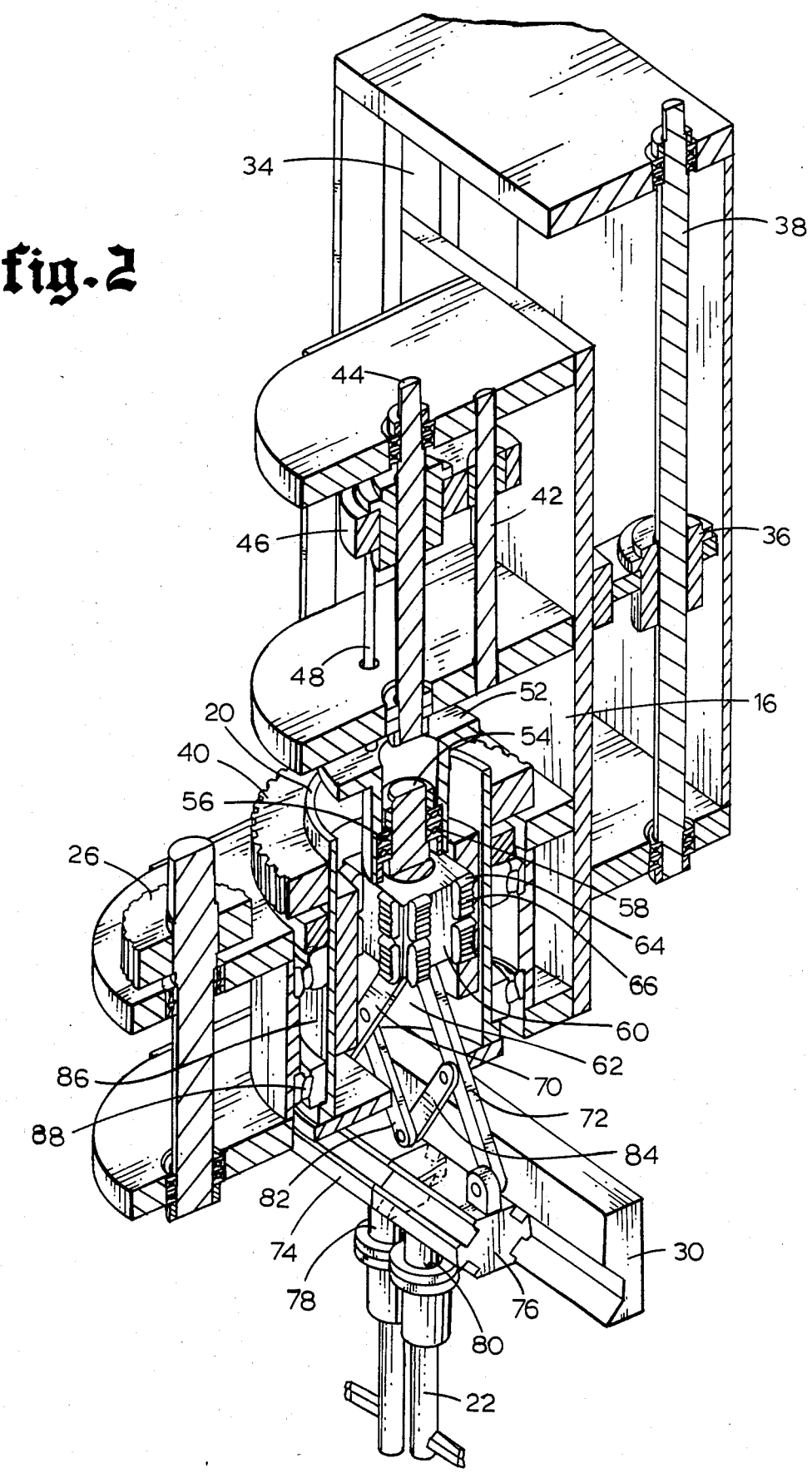
FIG. 2 is a perspective sectional view taken generally along the lines 2—2 of FIG. 1.
Figure 3:
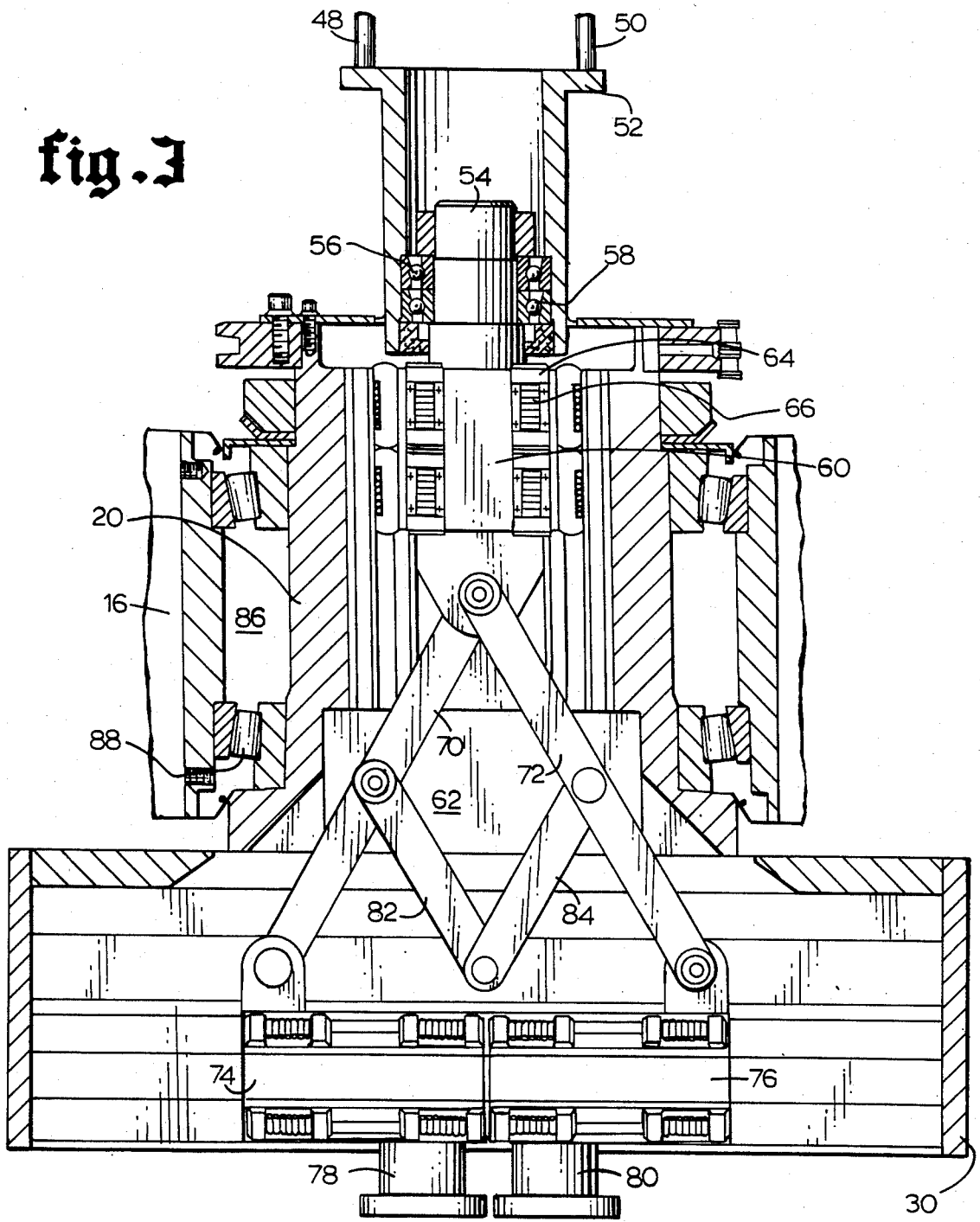
FIG. 3 is a sectional view of the spindle mechanism incorporating the principles of this invention.

Referring to FIGS. 2 and 3, the drive head 16 moves vertically within a track 34 on the column 18. A ball nut 36 secured to the drive head 16 causes vertical movement of the drive head by the travel of the ball nut along a precision ball screw 38 in response to the controlled rotation of the ball screw 38 by the servo motor 32. Control of the servo motor 32 by a programmable control unit results in the precise vertical positioning of the drive head 16 on the column 18. Rollers or other bearing means not shown may be added to the drive head 16 to facilitate movement within the track 34. The rotatable spindle 20 supported within the drive head housing 16 has a gear sprocket 40 secured to its outer diameter. The drive motor 24 rotates the spindle mechanism 20 utilizing the drive belt and gear assembly 26 and the gear sprocket 40.

The drive head 16, at its upper half, is comprised of a precision ball screw 44 and ball nut 46. The ball nut 46 travels up and down the ball screw 44 as it is rotated by the drive motor 28. The ball nut 46 is also connected to a stabalizing arm 42 for additional support. Two support members such as 48 and 50 are connected to the ball nut 46, at its opposite sides, and they are also attached at their lower ends to a hollow coupler 52 of the spindle assembly 20. The ball nut 46 moves the attached support members 48, 50, and the connected coupler 52 vertically as it travels up or down the ball screw 44 as the ball screw is rotated by the drive motor 28. A circular shaft 54 is mounted inside the coupler 52, locked in vertical position by retaining bearings such as 56 and 58. The bearings 56 and 58 allow the shaft 54 to change vertical position in combination with the coupler only, but it may rotate within the coupler and move vertically with the coupler at the same time. A support member 60 is connected to the end of the shaft 54. The support member 60 is connected to an isosceles linkage mechanism 62 to change the vertical position of its vertex. Bearing housings typical of 64 which contain a multitude of bearings such as 66 are secured to the periphery of the support member 60 that allow the support member 60 to move vertically on the inner race 68 within the inner housing wall of the spindle 20.

The isosceles linkage mechanism 62 is comprised of two support legs 70 and 72 which are of equal length and pivotally connected to the support member 60. The pivot point of the support legs 70 and 72 is located on the axis of rotation of the spindle mechanism 20. Attached to the legs 70 and 72 are moveable guide members 74 and 76 that move horizontally on the track 30. The moveable guide members 74 and 76 support tool chucks 78 and 80 that secure cutting tools such as 22 to the spindle. As the ball screw 44 is rotated by the drive motor 28, the ball nut assembly 46 raises or lowers the support members 48, 50, the coupler 52, support member 60, and the vertex of the isosceles linkage mechanism vertically.

Figure 4:
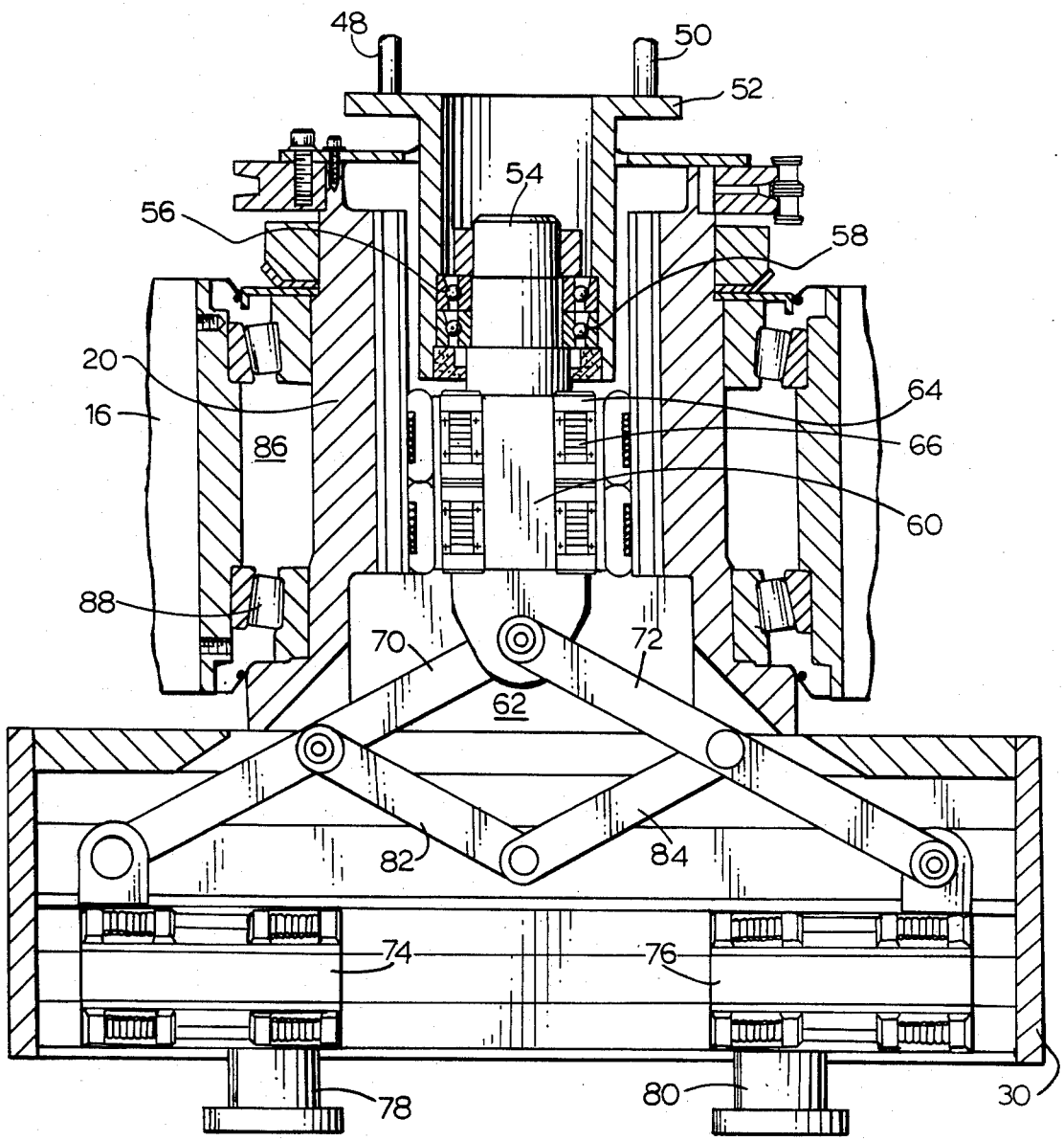
FIG. 4 is a sectional view of the spindle mechanism with an increased cutting radius.

As can be seen in FIG. 4, this vertical movement causes the legs of the isosceles linkage mechanism, 70 and 72 to change their angular position with respect to the axis of the spindle by means of the pivot arms 82 and 84 to cause horizontal movement of the moveable guide members 74 and 76 along the track 30. Thus, the cutting radius of the cutting tools 22 can be precisely controlled by means of the servo motor 28 in response to a programmable control unit utilizing the isosceles linkage mechanism 62 to control the distance of the cutting tools from the axis of rotation of the spindle 20.

The spindle 20 is supported within an outer race 86 of the drive head 16 and rotates therein by means of bearings such as 88. The outer gear 40 that attaches to the outer housing of the spindle mechanism 20 is driven by the drive belt and gear assembly 26 and servo motor 24 to rotate the spindle mechanism. Therefore, in addition to the control speed rate of the spindle and cutting tool 22, the drive head 16 can also simultaneously adjust the cutting radius utilizing the servo drive motor 28 and the isosceles linking mechanism 62. A constant cutter feed rate is maintained by adjusting the rotation rate of the cutting tool 22 in proportion to the distance of the cutting tool from the centerline of rotation.

The various automated machining functions and precise alignment of the machine tool 10 are controlled by a programmable control unit not shown but well known in the art. The programmable control unit may be a numerical control system with its program stored on a punched tape or other memory device. In addition to performing other functions, it controls the movement of the worktable in a horizontal plane, the speed rate of the rotatable spindle, the vertical position of the drive head, and the cutting radius of the cutting tool.

Although there has been illustrated and described specific detail and structure of operation, it is clearly understood that the same were merely for purposes of illustration and that changes and modifications may be readily made by those skilled in the art without departing from the spirit and scope of this invention.

What we claim is:

1. A machine tool, comprising:
   (a) A frame;
   (b) A work table means generally supported on the frame and movable latitudinally and longitudinally in a horizontal plane for supporting a workpiece to be machined;
   (c) A drive head means movably mounted on the frame generally above the worktable for vertical movement and for rotating a rotatable spindle that supports a cutting tool; and
   (d) A programmable control means for controlling an isosceles linkage adjusting means connected to the rotatable spindle for moving the cutting tool along an axis perpendicular to the rotatable spindle's axis of rotation and changing the rotation rate of the rotatable spindle in response to the radial distance of the cutting tool from the axis of rotation.

2. A machine tool as recited in claim 1 wherein the isosceles linkage adjusting means is generally comprised of:
   a motor means for rotating a precision screw means for changing the vertical position of a nut assembly mounted on the precision screw means; and
   an isosceles linkage mechanism attached to the nut assembly having two support legs of equal length pivotally connected at one end to the nut assembly and having a movable cutting tool connected to the opposite end of one support leg whereby a vertical change in the vertex position of the isosceles linkage mechanism causes the cutting tool to change position along a horizontal axis perpendicular to the axis of rotation of the rotatable spindle.

3. A machine tool as recited in claim 2 wherein a movable cutting tool is connected to the opposite end of each support leg of the isosceles linkage mechanism whereby a vertical change in the vertex position of the isosceles linkage mechanism causes the cutting tools to change position along a horizontal axis perpendicular to the axis of rotation to the rotatable spindle.

4. A machine tool as recited in claim 3 wherein the functions of the worktable means, the drive head means, and adjusting means are controlled by a programmable control means for automatically machining the workpiece.

5. A machine head for use on an automated machining station comprising:
   a. a support frame disposed to be mounted on an automated machining station;
   b. a drive head means movably mounted on the support frame for vertical movement thereon and for rotating a rotatable spindle that supports a cutting tool; and
   c. a programmable control means for controlling an isosceles linkage adjusting means connected to the rotatable spindle for moving the cutting tool along an axis perpendicular to the rotatable spindle's axis of rotation and changing the rotation rate in response to the radial distance of the cutting tool from the axis of rotation.

6. A machine head as recited in claim 5 wherein the isosceles linkage adjusting means is generally comprised of:
   a motor means for rotating a precision screw means for changing the vertical position of a nut assembly mounted on the precision screw means; and an isosceles linkage mechanism attached to the nut assembly having two support legs of equal length pivotally connected at one end to the nut assembly and having a movable cutting tool connected to the opposite end of one support leg whereby a vertical change in the vertex position of the isosceles linkage mechanism causes the cutting tool to change position along a horizontal axis perpendicular to the axis of rotation of the rotatable spindle.

7. A machine head as recited in claim 6 wherein a movable cutting tool is connected to each support leg of the isosceles linkage mechanism whereby a vertical change in the vertex position of the isosceles linkage mechanism causes the cutting tools to change position along a horizontal axis perpendicular to the axis of rotation to the rotatable spindle.

8. A machine head as recited in claim 7 wherein the functions of the drive head means and adjusting means are controlled by a programmable control means for automatically machining the workpiece.

* * * * *